United States Patent
Yoshida et al.

(10) Patent No.: US 6,545,747 B2
(45) Date of Patent: Apr. 8, 2003

(54) IMAGE PROCESSING APPARATUS AND METHOD AND STORAGE MEDIUM STORING PROGRAM

(75) Inventors: Takashi Yoshida, Tokyo (JP); Isao Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/878,303

(22) Filed: Jun. 12, 2001

(65) Prior Publication Data

US 2001/0028445 A1 Oct. 11, 2001

Related U.S. Application Data

(62) Division of application No. 09/089,428, filed on Jun. 3, 1998.

(30) Foreign Application Priority Data

Jun. 5, 1997 (JP) .............................................. 9-147798

(51) Int. Cl.⁷ .............................................. G03B 27/44
(52) U.S. Cl. .......................................... 355/54; 355/40
(58) Field of Search ............................. 355/40, 77, 39, 355/41, 54; 358/449, 451, 403; 395/49; 396/335

(56) References Cited

U.S. PATENT DOCUMENTS

| | | | |
|---|---|---|---|
| 4,720,733 A | * 1/1988 | Ohtake et al. .............. 355/133 |
| 5,563,984 A | * 10/1996 | Tanibata ...................... 355/40 |
| 5,608,542 A | * 3/1997 | Krahe et al. ................. 358/449 |
| 5,696,576 A | 12/1997 | Itoh et al. ...................... 355/40 |
| 5,703,701 A | * 12/1997 | Yamamoto et al. ........... 355/41 |
| 5,749,012 A | 5/1998 | Kodaira ....................... 396/435 |
| 5,767,947 A | * 6/1998 | Schindler et al. .............. 355/39 |
| 5,828,422 A | 10/1998 | Wess ........................... 355/40 |
| 5,838,457 A | * 11/1998 | Umemoto .................... 358/302 |
| 5,905,580 A | * 5/1999 | Cok et al. .............. 235/462.15 |
| 5,905,589 A | * 5/1999 | Cok et al. .................... 358/302 |
| 6,008,910 A | 12/1999 | Ikeda et al. ................. 358/487 |
| 6,079,885 A | * 6/2000 | Sano ........................... 400/61 |
| 6,266,128 B1 | * 7/2001 | Yoshida et al. ................ 355/40 |
| 2001/0028445 A1 | * 10/2001 | Yoshida et al. ................ 355/40 |

\* cited by examiner

Primary Examiner—Russell Adams
Assistant Examiner—D. Ben Esplin
(74) Attorney, Agent, or Firm—Fitzpatrick, Cella, Harper & Scinto

(57) ABSTRACT

An image processing apparatus which outputs an index print of information representing a plurality of pictures having picture size of different aspect ratios, with each of the plurality of pictures being respectively assigned a number in numerical order. The image processing apparatus detects size information for each of the plurality of pictures based on the respective aspect ratios, and a picture output order different from the numerical order is determined based on the detected size information for each of the plurality of pictures.

25 Claims, 7 Drawing Sheets

IMAGE PROCESSING APPARATUS AND METHOD AND STORAGE MEDIUM STORING PROGRAM

This application is a divisional of application No. 09/089,428 filed Jun. 3, 1998.

BACKGROUND OF THE INVENTION

1. Field of the Invention

The present invention relates to an image processing apparatus for realizing a photographic printer (or photoprinter) that is adapted to produce an index print of information representing a plurality of images inputted from an image input device, for example, a digital camera, on, for instance, a single sheet of printing paper.

2. Description of the Related Art

In recent years, digital cameras have come into wide use. As a simple means for printing and outputting pictures taken by digital cameras, there have been proposed photoprinters adapted so that image data is inputted thereto by connecting digital cameras directly thereto or by setting a storage medium, which stores image data representing pictures taken by digital cameras. Further, some of these proposed photoprinters include the function of forming an index print of image data, which are stored in a digital camera connected thereto or in a storage medium set therein, on, for example, a sheet of printing paper so that pictures represented by the image data are printed thereon in a small size. Such an index print permits users to check a plurality of images at a time, and facilitates selection of one of the pictures.

However, in the case of using such conventional photoprinters, the order in which pictures are printed on an index print sheet depends on numbers respectively assigned to the pictures in a digital camera or a storage medium, and is, for instance, a photographing order. Thus, the conventional photoprinters have the following drawbacks.

Namely, in the case of producing an index print which is a single print composed of a plurality of pictures of print sizes of different aspect ratios, such as a normal size and a panorama size, when these pictures are arranged and printed in the order of the aforementioned number assigned to each thereof, a result of producing the index print is obtained as illustrated in FIG. 6. Namely, 4 pictures, whose print sizes are a normal size or a panorama size, are arranged on each line or row. Incidentally, a number assigned to each of the pictures is a picture number. Among these pictures, the print size of pictures Nos. 4', 10', 13' and 15' is the panorama size. However, as is seen from the resultant index print illustrated in FIG. 6, the conventional photoprinter produces an index print which excels in the indexing ability but has a defect in that pictures of a panorama size are small and are difficult to view.

Turning to FIG. 7, there is shown an index print produced by enlarging a picture of a panorama size so that the longitudinal dimension of the panorama size is equal to the longitudinal dimension of a normal size. Although pictures of the panorama size in this case are easy to view, only one picture of the panorama size can be placed on a row. Thus, a line feed (operation) is forcibly performed each time a picture of the panorama size is printed. This results in a large wasteful or useless space on a sheet of printing paper. Thus the appearance of the index print is poor. Moreover, printing paper is wasted.

The present invention is directed to eliminating the aforementioned drawbacks of the conventional photoprinter.

SUMMARY OF THE INVENTION

Accordingly, an object of the present invention is to provide an image processing apparatus for obtaining an index print which excels in the indexing ability and looks attractive without making wasteful space, in an image editing system for layout of a plurality of images of different sizes.

To achieve the foregoing object, in accordance with the present invention, there is provided an image processing apparatus for outputting an index print of information representing a plurality of images, which comprises: input means for inputting the plurality of images to which numbers are respectively assigned; means for detecting size information on image sizes of the plurality of images; decision means for determining an outputting order, which is different from a numerical order determined by the numbers respectively assigned to the plurality of images, according to the size information on image sizes of the plurality of images; and output means for outputting the plurality of images according to the outputting order.

Other features, objects and advantages of the present invention will become apparent from the following description of preferred embodiments with reference to the drawings in which like reference characters designate like or corresponding parts throughout several views.

DETAILED DESCRIPTION OF THE PREFERRED EMBODIMENTS

Hereinafter, the preferred embodiments of the present invention are described in detail by referring to the accompanying drawings.

First Embodiment

Figure 1:
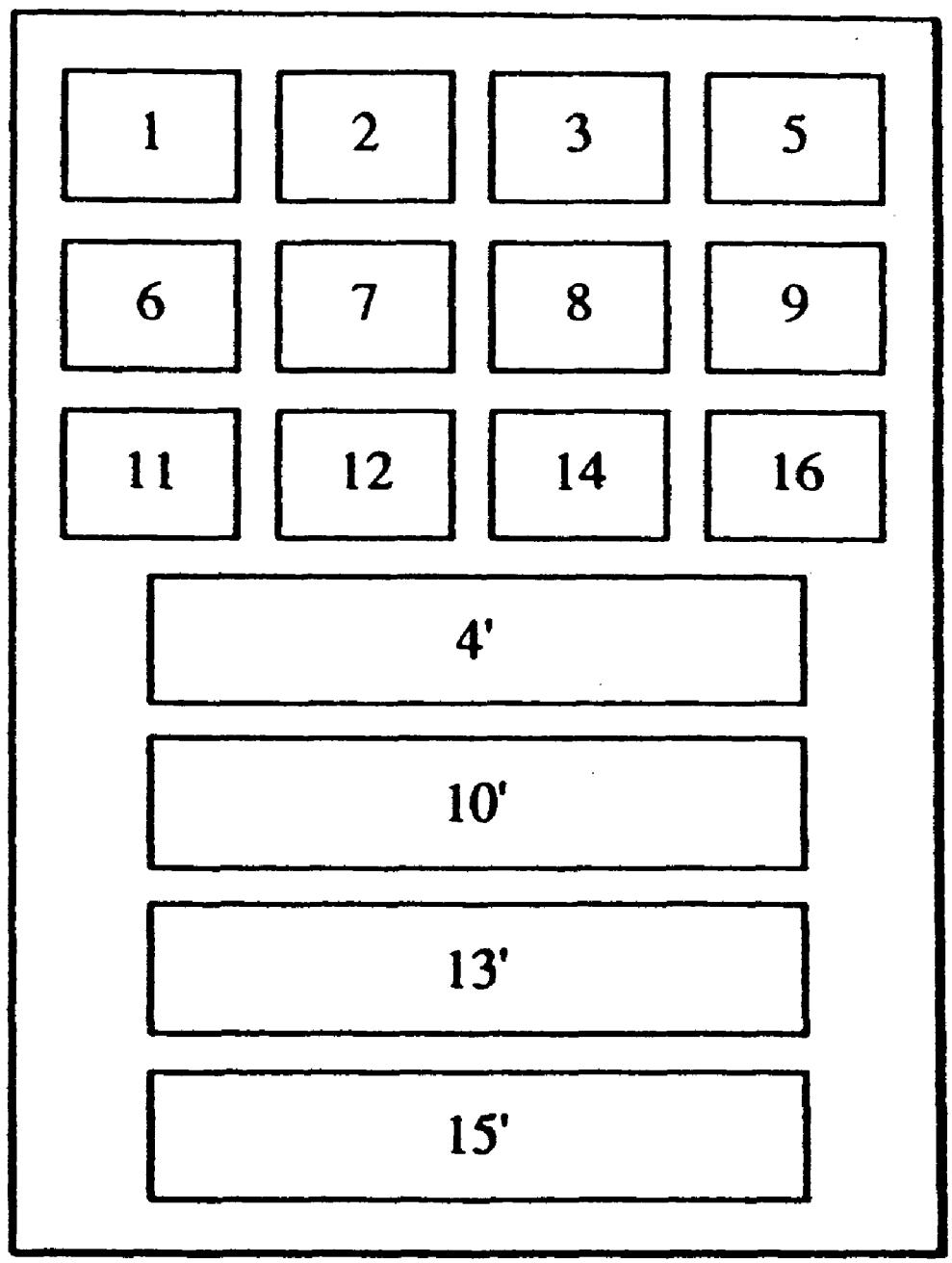
FIG. 1 is a diagram showing a result of producing an index print in a first embodiment of the present invention.

Hereunder, a first embodiment of the present invention is described. In this embodiment, image data, which represent pictures taken by a digital camera and are stored in an internal memory of the aforesaid digital camera, and are read therefrom. Then, the order in which the pictures are arranged according to the sizes of the pictures is changed. Subsequently, an index print of the image data is produced as illustrated in FIG. 1. Namely, as shown in FIG. 1, only pictures of a normal size are printed in a first or former half of the index print in such a way that four such pictures are printed on each row or line thereof. Further, only pictures of a panorama size are printed in a second or latter half of the index print in such a manner that one such picture is printed on each row.

Figure 2:
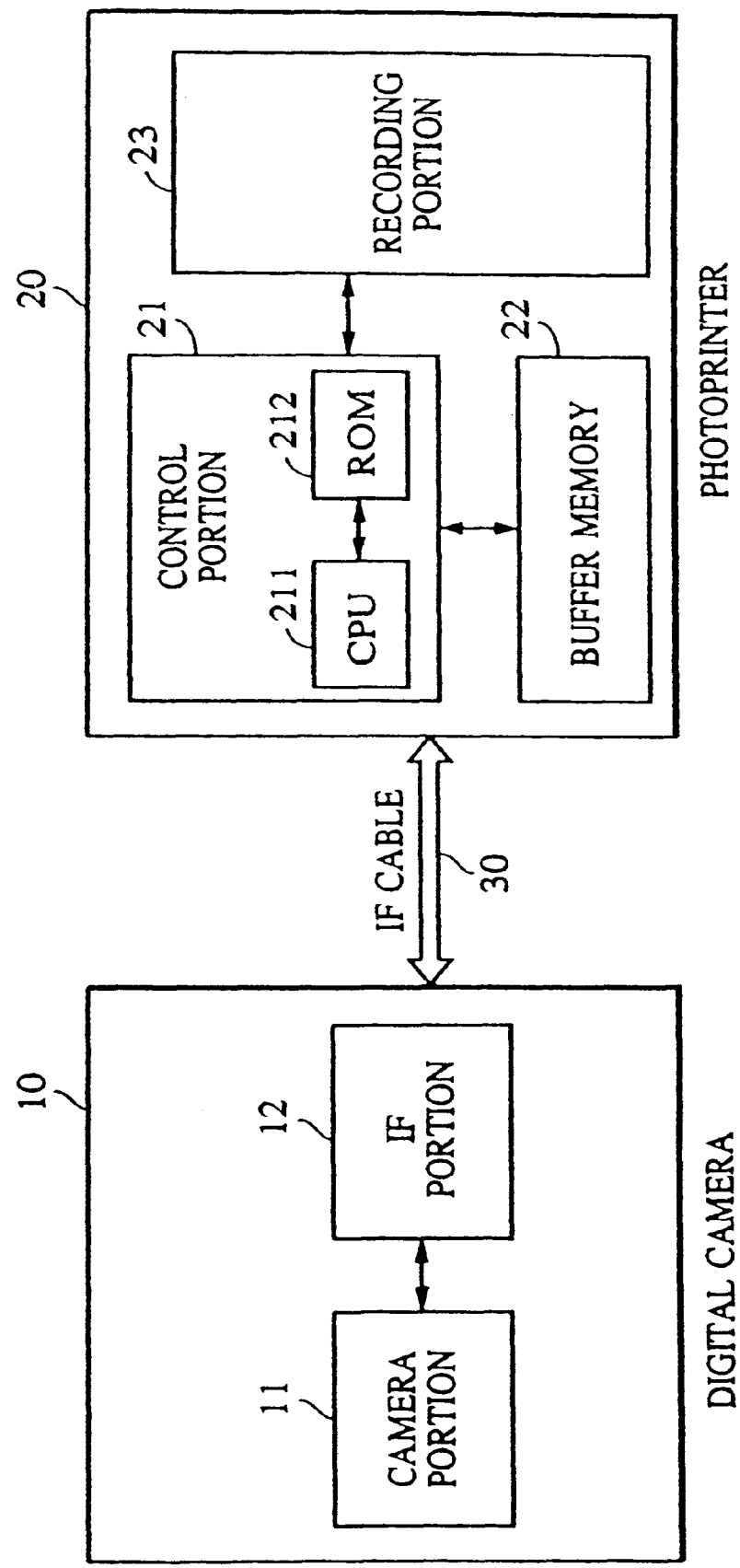
FIG. 2 is a diagram illustrating the hardware configuration of the first embodiment of the present invention.

FIG. 2 is a diagram illustrating the hardware configuration of the first embodiment of the present invention.

In FIG. 2, reference numeral 10 designates a digital camera that comprises: a camera portion 11 which converts a picture taken through a lens (not shown) into an electrical signal by means of a photoelectric conversion element or device or the like, and stores image data representing the taken picture, together with attribute information indicating a corresponding picture number and a picture size thereof; and an interface portion 12 which reads the image data and the attribute information from the camera portion 11 in accordance with a command transmitted from a photoprinter (to be described later). Further, an interface cable 30 connects the digital camera 10 with a photoprinter 20.

The photoprinter 20 consists of a control portion 21, a buffer memory 22 and a recording portion 23 which prints image data on a recording medium, namely, printing paper by employing, for example, an ink jet method. The control portion 21 composed of CPU 211 and ROM 212 issues various commands to the digital camera 10 and causes the buffer memory 22 to store input image data and to output image data to the recording portion 23 correspondingly to rows or lines of an index print, respectively. Incidentally, in the case of this embodiment, image data representing four pictures of the normal size are outputted corresponding to each line of the first half of an index print, while image data representing a single picture of the panorama size is outputted corresponding to each line of the second half thereof. It is assumed that these operations of the control portion 21 are performed in accordance with a program stored in ROM 212.

Next, an operation of the control portion 21 of the photoprinter 20 in the case of producing an index print is described in detail hereinbelow with reference to the flowchart of FIG. 3.

First, in step S1, the initial values of variables x and n are set at 0 and 1, respectively. Incidentally, the variable x indicates the number of pictures of the normal or standard size stored in the buffer memory 22 in such a manner as to be laid on a row or line of interest of the printing paper, and the maximum value of the variable x is 4. Further, the variable n designates the image No. of an image or picture of interest, which is represented by image data now inputted from the digital camera 10.

Subsequently, in step S2, the control portion 21 requests the digital camera 10 through the interface cable 30 to send the attribute information, such as size information on the size of an image No. n, namely, information representing what is called the size ratio of the normal or standard size or the panorama size. Then, in step S3, it is judged whether or not detected attribute information is a code indicating an end of image data. If so, the control portion 21 advances to step S11. In contrast, if not, the control portion 21 proceeds to step S4.

In step S4, the control portion 21 judges from detected attribute information which of the normal size and the panorama size the size of the image of interest, namely, the image No. n is. If the image of interest is of the panorama size, the control portion 21 advances to step S10 whereupon the variable n is updated by being changed into (n+1). Then, the control portion 21 returns to step S2. Namely, thus, in the case that the image of interest is of the panorama size, the control portion 21 bypasses this image and changes an image of interest to the next image by incrementing the variable n. In contrast, if it is judged in step S4 that the image of interest is of the normal size, the control portion 21 advances to step S5.

In step S5, the control portion 21 requests the digital camera 10 to send image data representing the (current) image No. n, and further stores the inputted image data representing this image No. n in the buffer memory 22. Subsequently, the control portion 21 goes forward to step S6 whereupon the variable x is updated by being changed into (x+1). Then, the control portion 21 advances to step S7.

In step S7, it is judged whether or not the variable x has reached 4. If not, the control portion 21 proceeds to step S10 whereupon the variable n is updated by being changed into (n+1). Then, the control portion 21 returns to step S2. In contrast, if it is found in step S7 that X=4, the control portion 21 goes forward to step S8.

In step 8, the variable x is reset to 0. Then, the control portion 21 advances to step S9 whereupon image data corresponding to four images of the normal size, which are stored in the buffer memory 22, are read therefrom and these four images are printed on a line or row. Subsequently, the control portion 21 goes forward to step S10 whereupon the variable n is updated by being changed into (n+1). Then, the control portion 21 goes back to step S2.

In the aforementioned process of repeating steps S2 to S10, if a code indicating an end of image data is detected or recognized, the control portion 21 advances to step S11. If there are image data representing pictures, which are not printed yet but are stored in the buffer memory 22, in step S11, such pictures, the number of which is not more than 4, of the normal size are printed on a line. Thus, the printing of all of the pictures of the normal size is completed.

Thence, the control portion 21 initiates and performs a process of printing pictures of the panorama size. Namely, the control portion 21 starts changing a picture of interest from a first one of the pictures of the panorama size in sequence. Further, only the pictures of the panorama size are printed in such a way that each such picture is printed on every row.

First, in step S12, the initial value of the variable n is set at 1. Then, the control portion 21 advances to step S13.

In this step S13, the control portion 21 requests the digital camera 10 through the interface cable 30 to send the attribute information, such as size information on the size of an image No. n, namely, information representing the size ratio of the normal or standard size or the panorama size. Then, in step S14, it is judged whether or not detected attribute information is a code indicating an end of image data. If so, the control portion 21 finishes performing this process illustrated in this flowchart. In contrast, if not, the control portion 21 proceeds to step S15.

In this step S15, the control portion 21 judges from detected attribute information which of the normal size and the panorama size the size of the image of interest, namely, the image No. n is. If the image of interest is of the normal size, the control portion 21 proceeds to step S18 whereupon the variable n is updated by being changed into (n+1). Then, the control portion 21 goes back to step S13. Namely, thus, in the case that the image of interest is of the normal size, the control portion 21 bypasses this image and changes an image of interest to the next image. In contrast, if it is judged in step S15 that the image of interest is of the panorama size, the control portion 21 proceeds to step S16.

In this step S16, the control portion 21 requests the digital camera 10 to send image data representing the (current) image No. n. Then, in step S17, the inputted image data representing the image of the panorama size, namely, this image No. n is printed in such a manner that this single image is printed on a row or line. Subsequently, the control portion 21 advances to step S18 whereupon the variable n is updated by being changed into (n+1). Then, the control portion 21 returns to step S13.

In the aforesaid process of repeating steps S13 to S18, if a code indicating an end of image data is detected or recognized in step S14, the entire operation of printing of all of the pictures is completed. As a consequence of the herein-above described operation, a resultant print is obtained in a manner where the pictures are arranged in the outputting order that is different from the order based on the numbers respectively assigned to the pictures, as illustrated in FIG. 1.

Figure 3:
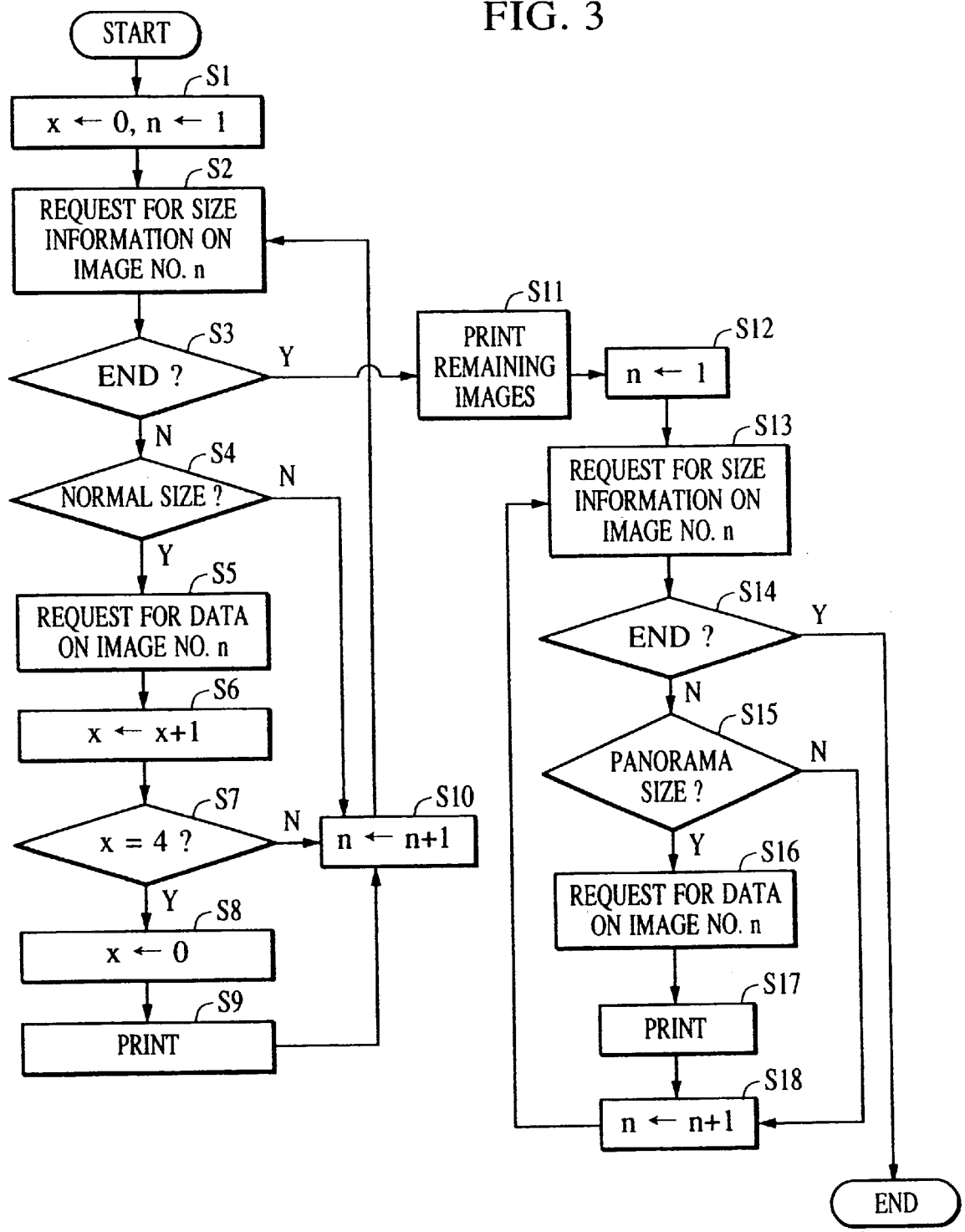
FIG. 3 is a flowchart illustrating an operation of a photoprinter of the first embodiment of the present invention.

Incidentally, the pictures of the panorama size and the pictures of the normal size can be placed in an upper part and a lower part of the printing paper, respectively, by replacing a process consisting of steps S1 to S11 of FIG. 3 with another process consisting of steps S12 to S18 shown in the same figure.

Second Embodiment

Figure 4:
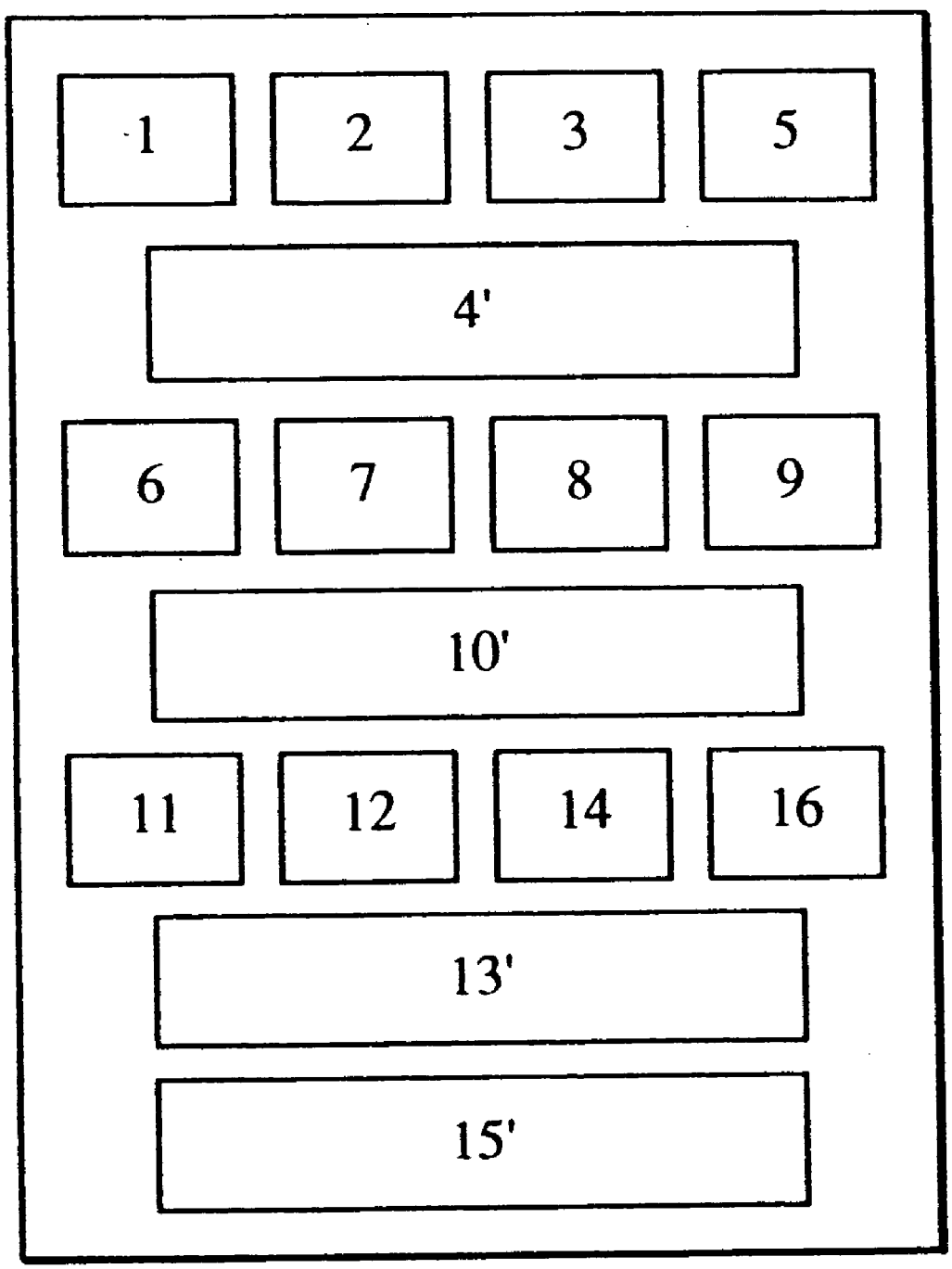
FIG. 4 is a diagram showing a result of producing an index print in a second embodiment of the present invention.

Next, a second embodiment of the present invention is described. In this embodiment, image data, which represent pictures taken by a digital camera and are stored in an internal memory of the aforesaid digital camera, are read therefrom. Then, the order in which the pictures are arranged according to the size of the pictures is changed. Subsequently, an index print of the image data is produced as illustrated in FIG. 4. Incidentally, as shown in FIG. 4, the pictures are printed without considerably changing the order in which the pictures are arranged, in such a way that four pictures of the normal sizes are printed on each row or line thereof and that one of pictures of the panorama size is printed in each row.

The hardware configuration of the second embodiment is similar to that of the first embodiment, namely, to that illustrated in FIG. 2.

Figure 5:
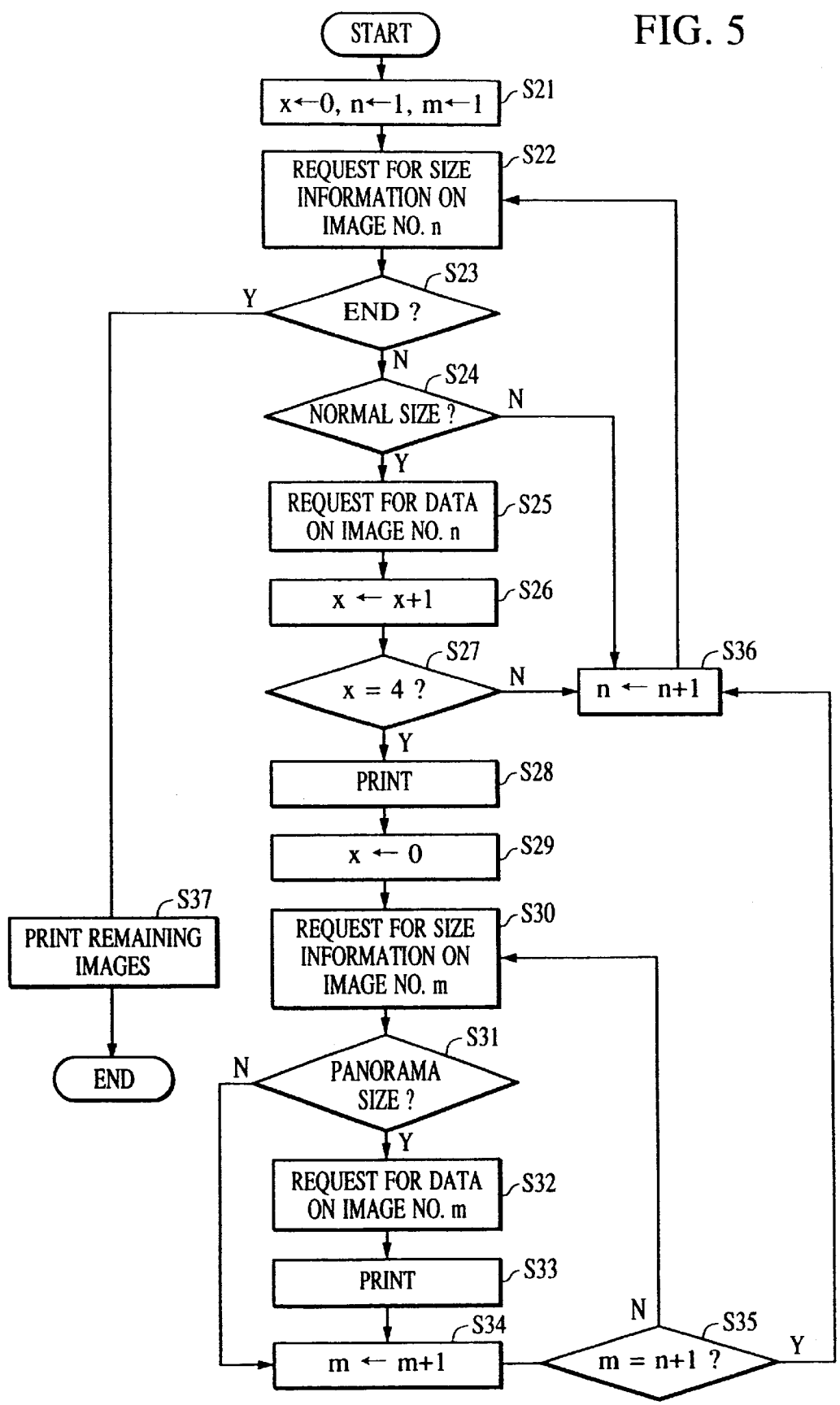
FIG. 5 is a flowchart illustrating an operation of a photoprinter of the second embodiment of the present invention.
Figure 6:
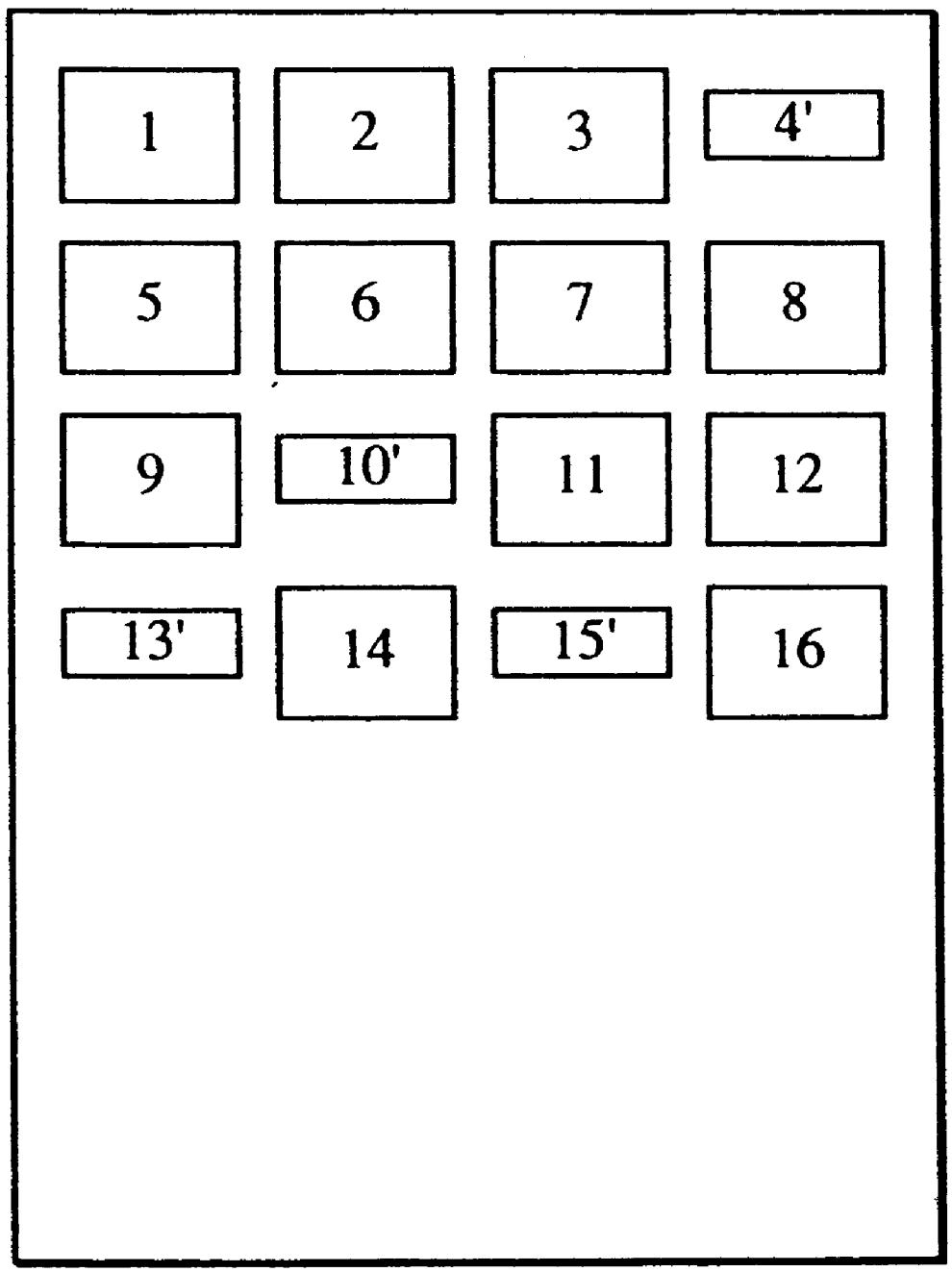
FIG. 6 is a diagram illustrating a first example of a result of producing an index print by a conventional photoprinter.
Figure 7:
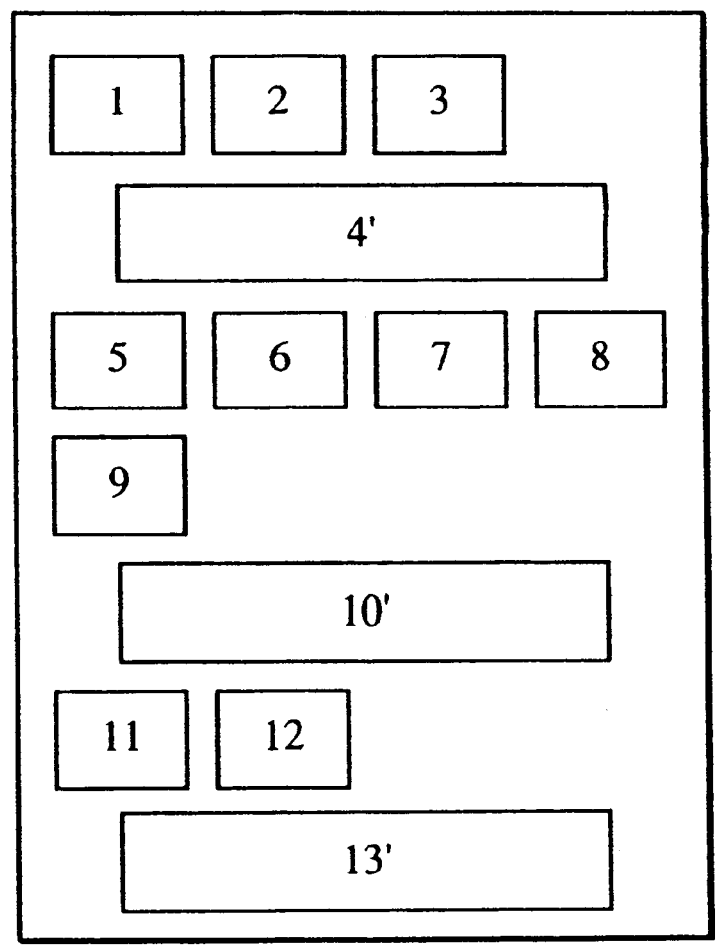
FIG. 7 is a diagram illustrating a second example of a result of producing an index print by a conventional photoprinter.
Figure 7:
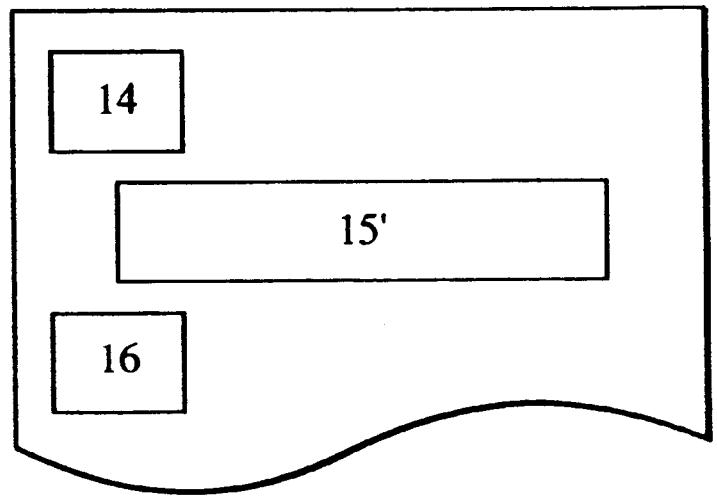

Next, an operation of the photoprinter 20 in the case of producing an index print is described in detail hereinbelow with reference to the flowchart of FIG. 5.

First, in step S21, the initial values of variables x, n and m are set at 0, 1 and 1, respectively. Incidentally, the variable x indicates the number of pictures of the normal or standard size, which are stored in the memory in such a way as to be laid out on a row or line of interest on the printing paper, and the maximum value of the variable x is 4. Further, the variables m and n designate the image No. of an image or picture of interest, which is of the normal size, and the image No. of a picture of interest, which is of the panorama size, respectively.

Subsequently, in step S22, the control portion 21 requests the digital camera 10 through the interface cable 30 to send the attribute information, such as size information on the size of an image No. n, namely, information representing the size ratio of the normal or standard size or the panorama size. Then, in step S23, it is judged whether or not detected attribute information is a code indicating an end of image data. If so, the control portion 21 proceeds to step S37. In contrast, if not, the control portion 21 advances to step S24.

In this step S24, the control portion 21 judges from detected attribute information which of the normal size and the panorama size the size of the image of interest, namely, the image No. n is. If the image of interest is of the panorama size, the control portion 21 goes forward to step S36 whereupon the variable n is updated by being changed into (n+1). Then, the control portion 21 goes back to step S22. Namely, thus, in the case that the image of interest is of the panorama size, the control portion 21 bypasses this image and changes an image of interest to the next image by incrementing the variable n. In contrast, if it is judged in step S24 that the image of interest is of the normal size, the control portion 21 proceeds to step S25.

In this step S25, the control portion 21 requests the digital camera 10 to send image data representing the (current) image No. n, and further stores the inputted image data representing this image No. n in the buffer memory 22. Subsequently, the control portion 21 advances to step S26 whereupon the variable x is updated by being changed into (x+1). Then, the control portion 21 goes forward to step S27.

In this step S27, it is judged whether or not the variable x has reached 4. If not, the control portion 21 advances to step S36 whereupon the variable n is updated by being changed into (n+1). Then, the control portion 21 goes back to step S22. In contrast, if it is judged in step S27 that X=4, the control portion 21 proceeds to step S28.

In this step 28, the variable x is reset to 0. Then, the control portion 21 goes forward to step S29 whereupon image data corresponding to four images of the normal size, which are stored in the buffer memory 22, are read therefrom and these four images are printed on a line or row. Subsequently, the control portion 21 goes forward to step S30.

Next, in this step S30, the control portion 21 requests the digital camera 10 through the interface cable 30 to send the attribute information, such as size information on the size of an image No. n, namely, information representing the size ratio of the normal or standard size or the panorama size.

In step S31, it is judged from the attribute information which of the normal size and the panorama size the size of the image of interest is, namely, the size of image No. m. If the image of interest is of the normal size, the control portion 21 advances to step S34 whereupon the variable m is updated by being changed into (m+1). Then, the control portion 21 proceeds to step S35. In this step S35, it is judged whether or not the variable m reaches (n+1). If NO (N), the control portion 21 returns to step S30. Conversely, if YES (Y), the control portion 21 goes back to step 36. In contrast, if it is judged in step S31 that the picture of interest is of the panorama size, the control portion 21 proceeds to step 32.

In this step S32, the control portion 21 requests the digital camera 10 to send image data representing the (current) image No. m. Then, in step S33, the inputted image data representing the image of the panorama size, namely, this image No. m is printed in such a manner that this single image is printed on a row or line. Subsequently, the control portion 21 proceeds to step S35 whereupon the variable m is updated by being changed into (m+1). In step S35, it is judged whether or not the variable m reaches (n+1). If N, the control portion 21 returns to step S30. In contrast, if Y, the control portion 21 returns to step S36.

In the aforesaid process of repeating steps S22 to S35, if a code indicating an end of image data is detected or recognized in step S23, the control portion 21 advances to step S37.

If there are image data representing pictures, which are not yet printed and are stored in the buffer memory 22, in step S37, such pictures, the number of which is not more than 4, of the normal size are printed on a line. Thus, the printing of all of the pictures of the normal size is completed. As a consequence of the herein-above described operation, a resultant print is obtained in a manner where the pictures are arranged in the outputting order that is different from the order based on the numbers respectively assigned to the pictures, as illustrated in FIG. 4.

Other Embodiments

Further, image data inputted in steps S5 and S16 is accompanied with the image No. n of a picture represented by the inputted image data. When printing the image data in step S8 or S17, the image No. n is printed in the neighborhood (for example, an upper part) of each of the pictures. Thus, the corresponding relation between the picture and the image No. becomes quite obvious. Consequently, the selection of the picture is further facilitated.

Moreover, in the foregoing description of the aforementioned first and second embodiments, each embodiment uses a digital camera as an image input device and directly connects the digital camera to the photoprinter. However, the present invention can be applied to the case where image data is inputted to this image processing apparatus from a storage medium which stores digital image data. At that time, the apparatus may be provided with means for detecting size information on the size of each picture in such a way as to automatically detect the size information. Alternatively, the apparatus may be adapted so that size information is manually inputted by a user. Furthermore, concerning the image Nos., the apparatus may be similarly adapted as the case of detecting size information.

Further, in the foregoing descriptions of the first and second embodiments, there have been described the embodiments in each of which the photoprinter is used as the image output device. However, the present invention may be applied to the case that the pictures are outputted in a manner in which the pictures are arranged on a virtual sheet to be displayed on the screen of a display device.

Moreover, in the foregoing descriptions of the first and second embodiments, there have been described the embodiments in each of which the control portion is provided in the photoprinter. The apparatus, however, may be configured so that a general purpose personal computer performs operations, which are similar to those performed by the control portion 21, in accordance with a program stored in a removable storage medium such as CD-ROM or a floppy disk.

Furthermore, in the foregoing descriptions of the first and second embodiments, there have been described embodiments that employ a mixture of input pictures having two different size ratios, namely, input pictures of the normal size and the panorama size, which are different in aspect ratio from each other. However, a plurality of pictures having three kinds of different size ratios, for instance, a classic size ratio (2:3) employed in a new system camera, an aspect ratio (9:16) employed in a high definition television (HD-TV) system and a panorama aspect ratio (1:3), may be used as input pictures. Additionally, a plurality of pictures having more than three kinds of different size ratios (or aspect ratios) may be used as input pictures. In addition, the present invention can be applied to the case that pictures having practically different aspect ratios are used even if the size ratios thereof are equal to one another, for example, the case that is called a longitudinally-oriented picture, namely, a landscape picture is distinguished from what is called a transversely-oriented picture, namely, a portrait picture among pictures of a normal size.

As described above, in accordance with the present invention, there is provided an image processing apparatus for outputting an index print of information representing a plurality of images, which comprises: input means for inputting the plurality of images to which numbers are respectively assigned; means for detecting size information on image sizes of the plurality of images; decision means for determining an outputting order, which is different from a numerical order determined by the numbers respectively assigned to the plurality of images, according to the size information on image sizes of the plurality of images; and output means for outputting the plurality of images according to the outputting order. Thus, an image processing apparatus for laying out a plurality of pictures of different sizes can obtain an index print, which excels in the indexing ability and has a good or fine appearance, without making a useless or wasteful space on the printing paper.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An image processing apparatus for outputting a list including a plurality of images, comprising:

input means for inputting the images;

detection means for detecting size information of the images inputted by said input means; and output means for outputting the images inputted by said input means in a predetermined placement in accordance with the size information detected by said detection means, wherein said output means outputs the images detected by said detection means as having a first size in a first placement and after outputting the images in the first placement, outputs the images detected by said detection means as taking a size different from the first size in a second placement.

2. An apparatus according to claim 1, wherein the images inputted by said input means are images having numbers and said output means outputs the images based on the numbers.

3. An apparatus according to claim 2, wherein said output means starts to output the images in an order of numbers in the second placement after finishing outputting the images in an order of numbers in the first placement.

4. An apparatus according to claim 2, wherein said output means outputs the images in the order of numbers in the first placement and outputs the images in the order of numbers in the second placement switching from one placement to another by a row.

5. An apparatus according to claim 2, wherein said input means is an image input apparatus.

6. An apparatus according to claim 5, wherein the size is a size determined based on an aspect ratio of the image.

7. An apparatus according to claim 6, wherein said image input apparatus is a digital camera, the first size is a normal size, and the size different from the first size is a panorama size.

8. An apparatus according to claim 7, wherein the first placement is a placement, in which a plurality of images of normal size are arranged in an order of numbers in a row and the second placement is a placement, in which images of panorama size that are fewer than the first placement are arranged in an order of numbers in a row.

9. An apparatus according to claim 8, wherein in the second placement in one row one image of panorama size is placed.

10. An apparatus according to claim 1, wherein the outputting of a list is an index print which prints the images outputted by said output means on a sheet.

11. An apparatus according to claim 1, wherein said image processing apparatus is a printer.

12. An image processing apparatus for outputting a list including a plurality of images, comprising:

detection means for detecting size information of images inputted from an image input apparatus;

input control means for controlling the image input from said image input apparatus in accordance with the size information detected by said detection means; and output means for outputting in order the images input from said image input apparatus, wherein said input control means controls said input means in order that said input means inputs the image detected as having a first size by said detection means in order of a number and after inputting a predetermined number of the images of the first size inputs an image of a size different from the first size in order of the number.

13. An apparatus according to claim 12, wherein the images inputted by said image input apparatus are images having a number and said output means outputs the images based on the number.

14. An apparatus according to claim 13, wherein said output means outputs images inputted by said input apparatus by a row in order of the number.

15. An apparatus according to claim 14, wherein said input control means controls the image input so that after input of images of the first size is finished, input of images of the size different from the first size starts.

16. An apparatus according to claim 14, wherein said input control means controls the image input so that the input of images of said first size and the input of images of the size different from said first size are switched by a row in order of the number.

17. An apparatus according to claim 13, wherein the size is a size determined on a basis of an aspect ratio of the image.

18. An apparatus according to claim 17, wherein said image input apparatus is a digital camera, and the first size is a normal size and the size different form the first size is a panorama size.

19. An apparatus according to claim 18, wherein said input control means carries out the input of images of a same size continuously until said output means outputs a number of image corresponding to one row and numbers corresponding to the one row are more in a normal size than in a panorama size.

20. An apparatus according to claim 12, wherein the outputting of a list is an index print which prints the images outputted by said output means on a sheet.

21. An apparatus according to claim 12, wherein said image processing apparatus is a printer.

22. An image processing method of outputting a list including a plurality of images, comprising:

an input step, of inputting the images;

a detection step, of detecting size information of the images inputted by said input step; and an output step, of outputting the images inputted by said input step in a predetermined placement in accordance with the size information detected by said detection step, wherein said output step outputs the images detected by said detection step as taking a first size in a first placement and after outputting the images in the first placement and outputs the images detected by said detection step as taking a size different from the first size in a second placement.

23. An image processing method of outputting a list including a plurality of images, comprising;

a detection step, of detecting size information of images inputted from an image input apparatus;

an input control step, of controlling the image input from said image input apparatus in accordance with the size information detected by said detection step; and an output step, of outputting in order the images input from said image input apparatus, wherein said input control step controls said input step in order that said input step inputs the image detected as taking a first size of said detection step in order of a number and after inputting a predetermined number of the images of the first size inputs an image of a size different from the first size in order of the number.

24. A computer readable medium having recorded thereon code for implementing a computer implementable image processing method of outputting a list including a plurality of images, comprising:

code for an input step, of inputting the images;

code for a detection step, of detecting size information of the images inputted by said input step; and code for an output step, of outputting the images inputted by said input step in a predetermined placement in accordance with the size information detected by said detection step, wherein said output step outputs the images detected by said detection step as taking a first size in a first placement and after outputting the images in the first placement and outputs the images detected by said detection step as taking a size different from the first size in a second placement.

25. A computer readable medium having recorded thereon code for implementing a computer implementable image processing method of outputting a list including a plurality of images, comprising;

code for a detection step, of detecting size information of images inputted from an image input apparatus;

code for an input control step, of controlling the image input from said image input apparatus in accordance with the size information detected by said detection step; and code for an output step, of outputting in order the images input from said image input apparatus, wherein said input control step controls said input step in order that said input step inputs the image detected as taking a first size of said detection step in order of a number and after inputting a predetermined number of the images of the first size inputs an image of a size different from the first size in order of the number.

* * * * *

UNITED STATES PATENT AND TRADEMARK OFFICE
CERTIFICATE OF CORRECTION

PATENT NO. : 6,545,747 B2
DATED : April 8, 2003
INVENTOR(S) : Takashi Yoshida et al.

It is certified that error appears in the above-identified patent and that said Letters Patent is hereby corrected as shown below:

Column 3,
Line 57, "size" (first occurrence) should read -- size is --; and
Line 58, "n is," should read -- n. --.

Column 4,
Line 52, "size" (first occurrence) should read -- size is --; and
Line 53, "n is," should read -- n. --.

Column 5,
Line 6, "of" (second occurrence) should be deleted;
Line 8, "herein-above described" should read -- herein above-described --;
Line 61, "size" (first occurrence) should read -- size is -- and
Line 62, "n is," should read -- n. --.

Column 6,
Line 63, "herein-above described" should read -- herein above-described --.

Column 9,
Line 38, "form" should read -- from --; and
Line 43, "image" should read -- images --.

Column 10,
Line 8, "comprising;" should read -- comprising: --; and
Line 43, "comprising;" should read -- comprising: --.

Signed and Sealed this

Ninth Day of December, 2003

JAMES E. ROGAN
*Director of the United States Patent and Trademark Office*